(12) United States Patent
Achan et al.

(10) Patent No.: US 11,941,044 B2
(45) Date of Patent: Mar. 26, 2024

(54) AUTOMATIC PERSONALIZED IMAGE-BASED SEARCH

(71) Applicant: Walmart Apollo, LLC, Bentonville, AR (US)

(72) Inventors: Kannan Achan, Saratoga, CA (US); Sushant Kumar, Sunnyvale, CA (US); Kaushiki Nag, Santa Clara, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 583 days.

(21) Appl. No.: 16/259,822

(22) Filed: Jan. 28, 2019

(65) Prior Publication Data

US 2019/0236095 A1 Aug. 1, 2019

Related U.S. Application Data

(60) Provisional application No. 62/622,543, filed on Jan. 26, 2018.

(51) Int. Cl.
*G06F 16/56* (2019.01)
*G06F 16/21* (2019.01)
*G06F 16/50* (2019.01)
*G06F 16/535* (2019.01)
(Continued)

(52) U.S. Cl.
CPC .......... *G06F 16/535* (2019.01); *G06F 16/214* (2019.01); *G06F 16/50* (2019.01);
(Continued)

(58) Field of Classification Search
CPC .... G06F 16/535; G06F 16/56; G06F 16/9535; G06F 16/50; G06F 16/9536;
(Continued)

(56) References Cited

U.S. PATENT DOCUMENTS 11,379,227 B2 * 7/2022 Rao ..................... G06F 16/2453
2007/0250511 A1 10/2007 Endler et al.
(Continued)

FOREIGN PATENT DOCUMENTS

WO 2012104830 8/2012

OTHER PUBLICATIONS

Szegedy, et al., "Going Deeper with Convolutions," arXiv:1409.4842v1 [cs.CV], pp. 1-12, Sep. 17, 2014.
(Continued)

*Primary Examiner* — Marcin R Filipczyk
(74) *Attorney, Agent, or Firm* — BRYAN CAVE LEIGHTON PAISNER LLP

(57) ABSTRACT

A method including training a recurrent neural network model to create a trained model based at least in part on: (a) first images associated with first items on a website, (b) first search terms used by users of the website to search for the first items on the website, and (c) personal features of the users. The method also can include receiving an input image that was uploaded by a current user. The method additionally can include obtaining a user encoded representation vector for the current user based on a set of personal features of the current user. The method further can include generating an image encoded representation vector for the input image. The method additionally can include deriving search terms that are personalized to the current user for the one or more items depicted in the input image, using the trained model and based on the user encoded representation vector for the current user and the image encoded representation vector for the input image. Other embodiments are disclosed.

18 Claims, 7 Drawing Sheets

(51) Int. Cl.
*G06F 16/9535* (2019.01)
*G06N 3/08* (2023.01)

(52) U.S. Cl.
CPC .......... *G06F 16/56* (2019.01); *G06F 16/9535* (2019.01); *G06N 3/08* (2013.01)

(58) Field of Classification Search
CPC . G06F 16/9538; G06F 16/214; G06N 3/0445; G06N 3/0454; G06N 3/08; G06N 3/0895; G06T 2207/20081; G06T 2207/20084
See application file for complete search history.

(56) References Cited

U.S. PATENT DOCUMENTS

| | | |
|---|---|---|
| 2007/0288432 A1 | 12/2007 | Weltman et al. |
| 2014/0321773 A1 | 10/2014 | Hammon et al. |
| 2016/0140435 A1 | 5/2016 | Bengio et al. |
| 2017/0364537 A1* | 12/2017 | Kariman ............ G06Q 10/0637 |
| 2018/0012283 A1* | 1/2018 | Harve .................... A61B 5/742 |
| 2018/0137551 A1* | 5/2018 | Zheng ................... G06F 16/583 |
| 2019/0147228 A1* | 5/2019 | Chaudhuri ......... G06K 9/00288 382/118 |
| 2021/0049203 A1* | 2/2021 | Gupta ................... G06F 40/205 |

OTHER PUBLICATIONS

Vinyals, et al., "Show and Tell: A Neural Image Caption Generator," arXiv:1411.4555v2 [cs.CV], pp. 1-9, Apr. 20, 2015.
Graves, Alex, "Generating Sequences With Recurrent Neural Networks," arXiv:1308.0850v5 [cs.NE], pp. 1-43, Jun. 5, 2014.

* cited by examiner

401

501 – Selecting the first items from among a predetermined quantity of top-selling items on the website 502 – Determining the first images from images that are associated with the first items on the website 503 – Generating an image encoded representation vector for each of the first images 504 – Generating a user encoded representation vector for each user 505 – Determining the first search terms based on logs of click data for searches performed on the website 506 – Parsing a set of unigrams from a portion of the first search terms 507 – Selecting, as a training label, a top set of unigrams from the set of unigrams 508 – Generating a label encoded representation vector for each term of the training label 509 – Training the recurrent neural network model using the image encoded representation vector for each of the first images, the user encoded representation vector for each of the users, and the label encoded representation vector for each term of each of the training labels

FIG. 5

AUTOMATIC PERSONALIZED IMAGE-BASED SEARCH

CROSS-REFERENCE TO RELATED APPLICATION

This application claims the benefit of U.S. Provisional Application No. 62/622,543, filed Jan. 26, 2018. U.S. Provisional Application No. 62/622,543 is incorporated herein by reference in its entirety.

TECHNICAL FIELD

This disclosure relates generally to search engine technology and more specifically to providing automatic personalized image-based search.

BACKGROUND

Search engines have become common starting points for finding information and/or products on the Internet. Generally, in order to run a search on a search engine, a user of the search engine will type in search terms to describe what the user is interested in. For example, if the user is searching for a product, the user will type in a description of the product as the search terms. The effectiveness of the search can be limited by the ability of the user to describe the product using appropriate search terms.

BRIEF DESCRIPTION OF THE DRAWINGS

To facilitate further description of the embodiments, the following drawings are provided in which:

FIG. 5 illustrates a flow chart for a block of training a recurrent neural network model to create a trained model based at least in part on: (a) first images associated with first items on a website, (b) first search terms used by users of the website to search for the first items on the website, and (c) personal features of the users, according to the embodiment of FIG. 4;

Figure 1:
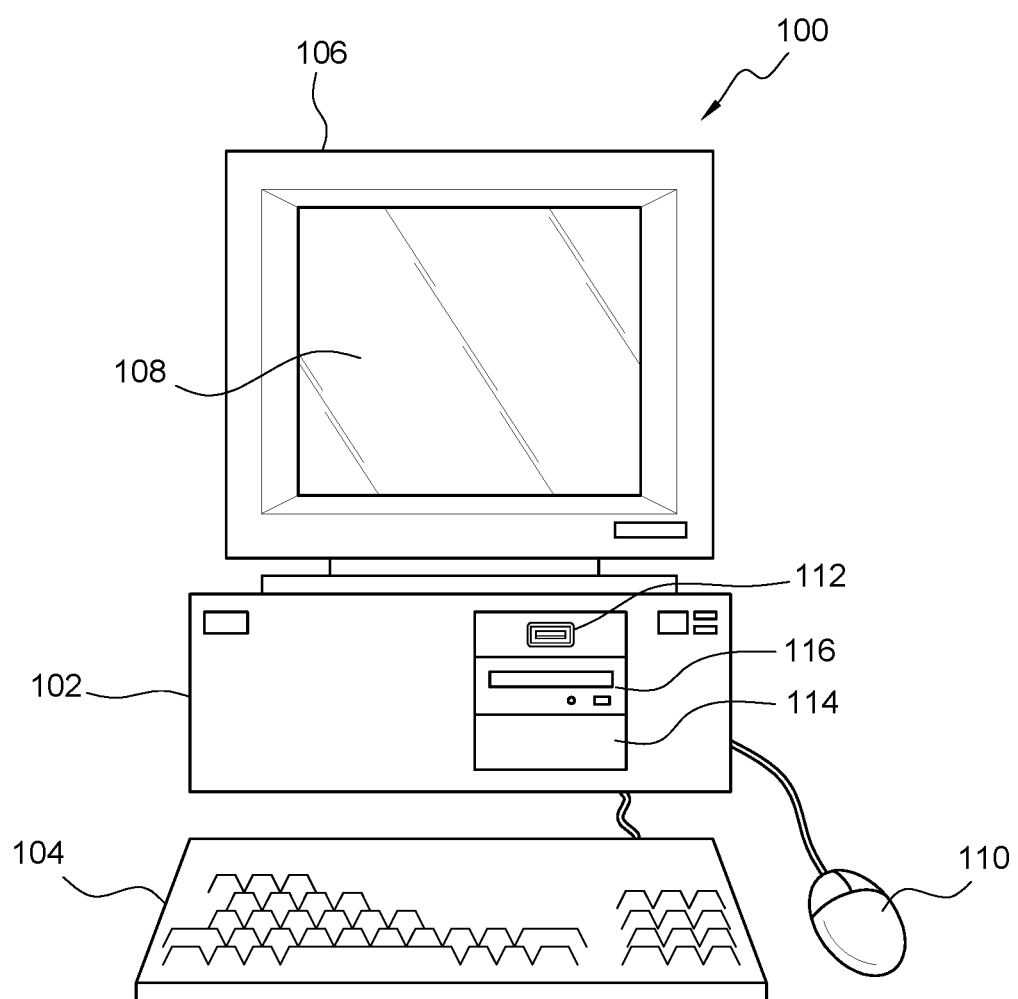
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, one hour, six hours, twelve hours, or twenty-four hours.

DESCRIPTION OF EXAMPLES OF EMBODIMENTS

Various embodiments can include a system including one or more processors and one or more non-transitory computer-readable media storing computing instructions configured to run on the one more processors and perform certain acts. The acts can include training a recurrent neural network model to create a trained model based at least in part on: (a) first images associated with first items on a website, (b) first search terms used by users of the web site to search for the first items on the website, and (c) personal features of the users. The acts also can include receiving an input image that was uploaded by a current user. The input image can include a depiction of one or more items. The acts additionally can include obtaining a user encoded representation vector for the current user based on a set of personal features of the current user. The acts further can include generating an image encoded representation vector for the input image. The acts additionally can include deriving search terms that are personalized to the current user for the one or more items depicted in the input image, using the trained model and based on the user encoded representation vector for the current user and the image encoded representation vector for the input image.

A number of embodiments can include a method being implemented via execution of computing instructions configured to run at one or more processors and stored at one or more non-transitory computer-readable media. The method can include training a recurrent neural network model to create a trained model based at least in part on: (a) first images associated with first items on a website, (b) first search terms used by users of the web site to search for the first items on the web site, and (c) personal features of the users. The method also can include receiving an input image that was uploaded by a current user. The input image can include a depiction of one or more items. The method additionally can include obtaining a user encoded representation vector for the current user based on a set of personal features of the current user. The method further can include generating an image encoded representation vector for the input image. The method additionally can include deriving search terms that are personalized to the current user for the one or more items depicted in the input image, using the trained model and based on the user encoded representation vector for the current user and the image encoded representation vector for the input image.

Figure 2:
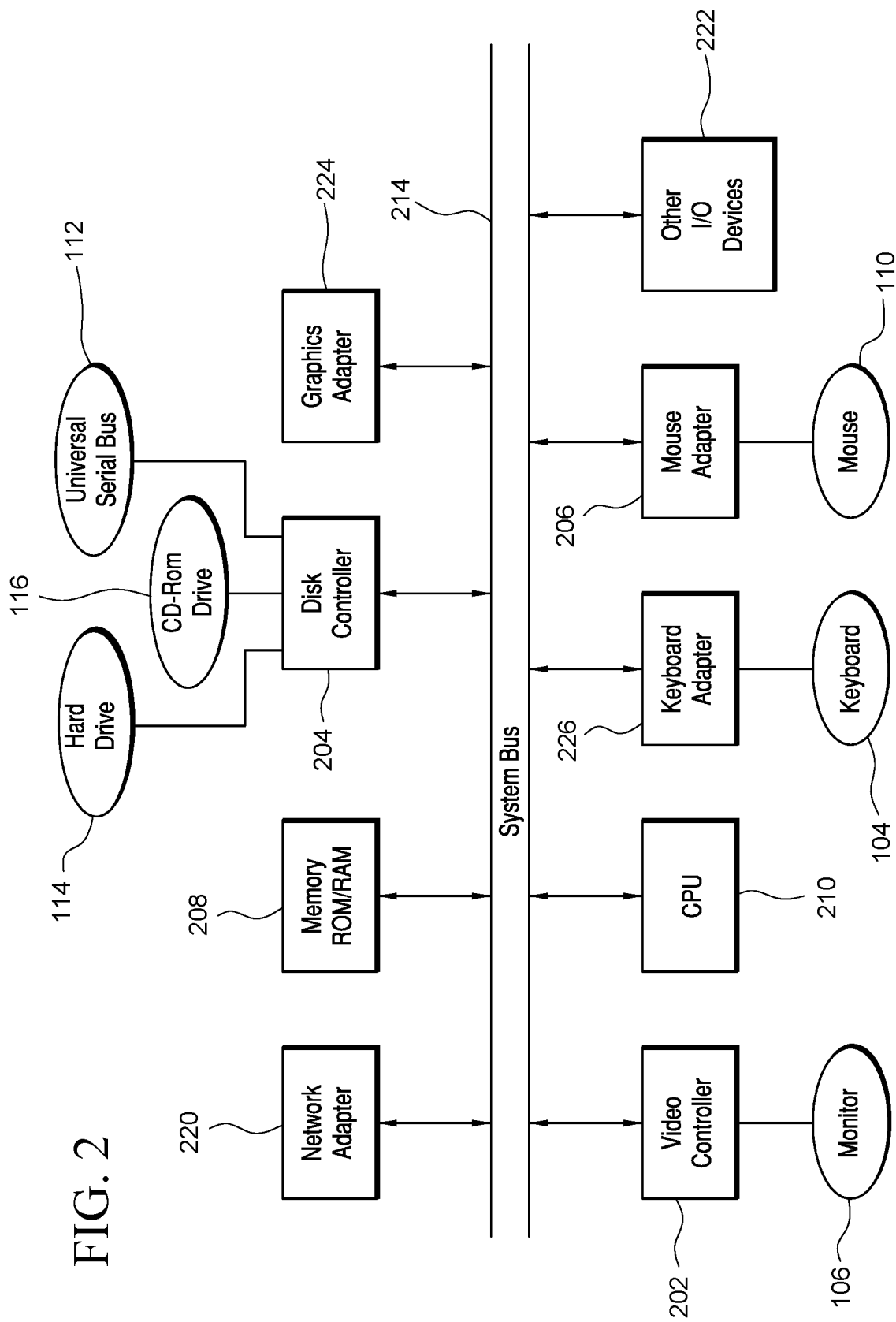
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
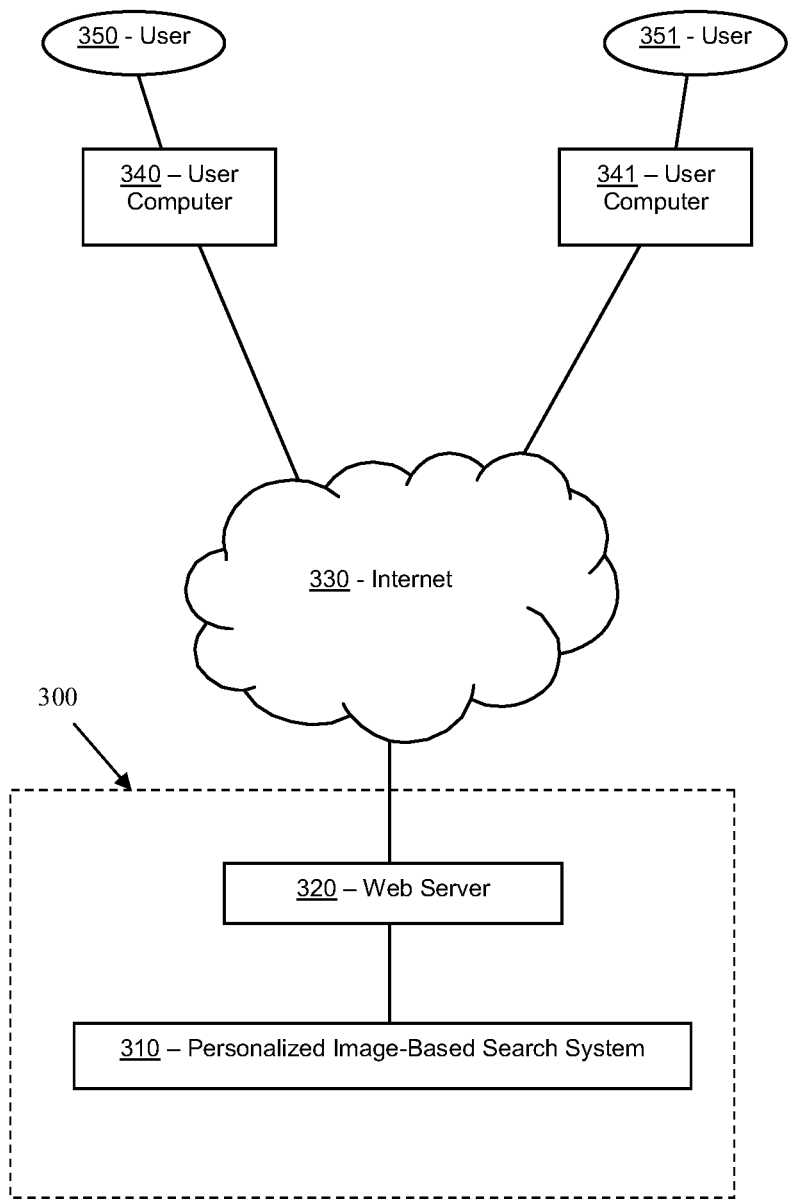
FIG. 3 illustrates a block diagram of a system that can be employed for automatic personalized image-based search, according to an embodiment.

Turning ahead in the drawings, FIG. 3 illustrates a block diagram of a system 300 that can be employed for automatic personalized image-based search, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a personalized image-based search system 310 and/or a web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Personalized image-based search system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host personalized image-based search system 310 and/or web server 320. Additional details regarding personalized image-based search system 310 and/or web server 320 are described herein.

In some embodiments, web server 320 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. In many embodiments, web server 320 can host one or more websites. For example, web server 320 can host a website that allows users to browse and/or search for items (e.g., products), to add items to an electronic cart, and/or to purchase items, in addition to other suitable activities.

In some embodiments, an internal network that is not open to the public can be used for communications between personalized image-based search system 310 and web server 320 within system 300. Accordingly, in some embodiments, personalized image-based search system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, personalized image-based search system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to personalized image-based search system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of personalized image-based search system 310 and/or web server 320. In a similar manner, the processors and/or the non-transitory computer-readable media can be local and/or remote to each other.

Meanwhile, in many embodiments, personalized image-based search system 310 and/or web server 320 also can be configured to communicate with one or more databases. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between personalized image-based search system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Conventionally, a search engine provided by a website that allows users (e.g., 350, 351) to search for items (e.g., products) typically constrains the user (e.g., 350, 351) to describe the item they are looking for by inputting textual search terms. The user (e.g., 350, 351) may have limited ability to describe the desired item due to various reasons, such as (a) lack of familiarity with the item, the brands associated with the item, and/or the features associated with the item, and/or (b) limited vocabulary in the language to be used for the search terms. For example, consider a user (e.g., 350, 351) who sees a particular bike at a park. The user (e.g., 350, 351) likes the bike, but is unsure whether it is a road bike, a mountain bike, or something else, and does not know how to describe the bike other than simply as a "bike." If the user (e.g., 350, 351) searched for the particular bike using the search term "bike," the search results would likely includes far more types of bikes than the user (e.g., 350, 351) has interest in considering.

In many embodiments, system 300 advantageously can allow a user (e.g., 350, 351) to upload an image and, in response, to receive search terms derived based on the uploaded image and/or search results based on the search terms derived. In several embodiments, the search terms and/or the search results can be personalized to the user (e.g., 350, 351) who uploaded in the image. For example, the search terms and/or the search results can be customized based on the personal features associated with the user (e.g., 350, 351), such as information in a registered profile of the user (e.g., 350, 351) and/or browsing history of the user (e.g., 350, 351).

In the example of the user who is interested in a bike but is unsure how to describe the bike, system 300 advantageously can allow the user to take a picture of the bike, such as using a camera on a mobile device (e.g., user computer 340-341) of the user, and then upload the image to the website hosted by web server 320. System 300 beneficially can derive search terms that describes the image, which can allow the user to search for the bike using the derived search terms. The personal features of the user (e.g., 350, 351) can be used by system 300 in deriving the search terms that are relevant for that particular user. For example, assuming the bike that was photographed was a road bike, and the gender of the user (e.g., 350, 351) is female, system 300 can derive search terms such as "road bikes for woman," and/or can perform a search using those derived search terms in order to display search results based on those search terms.

As another example, consider a user (e.g., 350, 351) who has searched on the website in the past for products to provide relief for back pain. If the user uploads an image of an office chair, system 300 can consider this browsing history as part of the personal features of the user. System 300 can determine that the image is that of an office chair, and based on the personal features of the user, can recommend search terms such as "office chairs for back pain," and/or can provide search results using those derived search terms.

As yet another example, consider a user (e.g., 350, 351) who recently purchased a television (TV) through the website hosted by web server 320, and who has uploaded an image of an audio speaker. System 300 can consider the recent purchase as part of the personal features of the user, and also can consider, as part of the personal features of the user, that the user typically purchases Samsung products. Based on the uploaded image and the personal features of the user, system 300 can derive search terms such as "Samsung TV sound system," and/or can provide search results using those derived search terms.

As a further example, consider a user (e.g., 350, 351) who recently purchased a 42-inch TV through the website hosted by web server 320, and who has uploaded an image of a TV stand. System 300 can consider the recent purchase as part of the personal features of the user. Based on the uploaded image and the personal features of the user, system 300 can derive search terms such as "42 inch TV stand," and/or can provide search results using those derived search terms.

In many embodiments, system 300 beneficially can train a model, which can predict the search terms that describe the items in the uploaded image and that are relevant to the user (e.g., 350, 351), based on the personal features of the user (e.g., 350, 351). By providing search terms that accurately describe the item in the uploaded image and that are personalized to the user, system 300 advantageously can improve the relevance of the search terms and/or the search results based on those search terms beyond those obtainable through conventional approaches. Moreover, system 300 beneficially can overcome the constraints of textual input, which can enable a user (e.g., 350, 351) to be able to search for the item in greater detail beyond the ability of the user (e.g., 350, 351) to describe the item using textual search terms.

Figure 4:
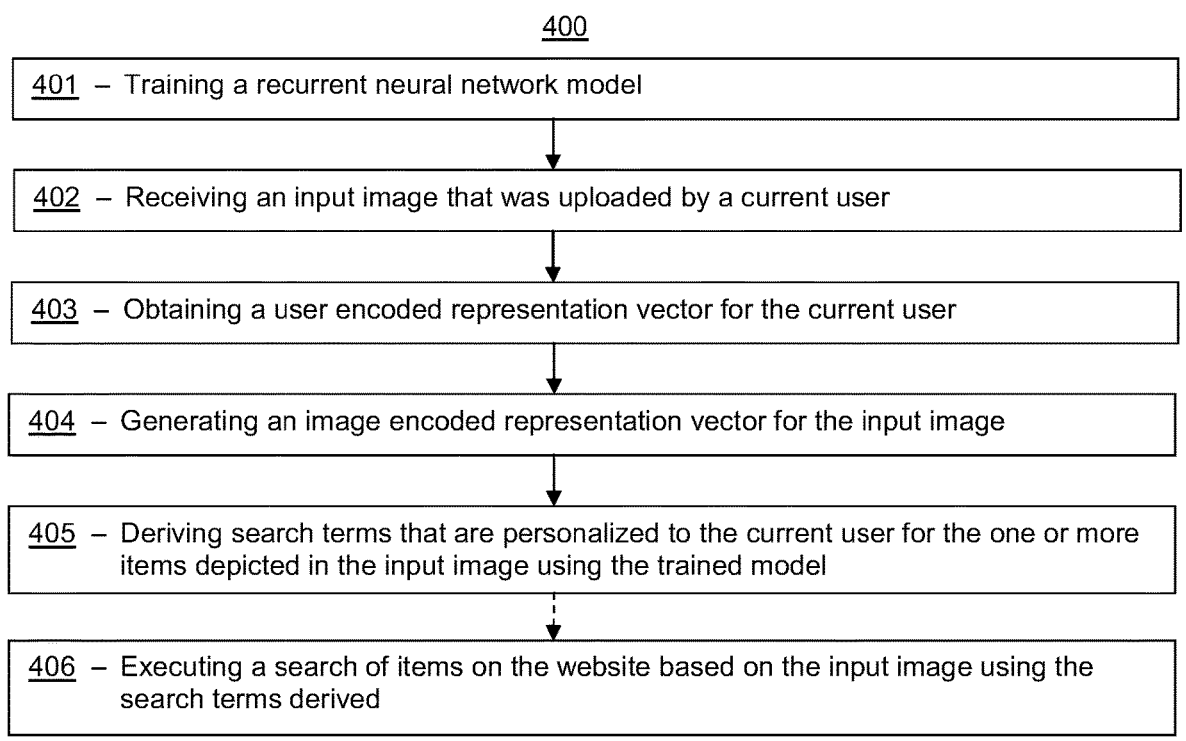
FIG. 4 illustrates a flow chart for a method, according to an embodiment.

Turning ahead in the drawings, FIG. 4 illustrates a flow chart for a method 400, according to an embodiment. In some embodiments, method 400 can be a method of automatic personalized image-based search. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as personalized image-based search system 310 and/or web server 320. The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 401 of training a recurrent neural network model to create a trained model based at least in part on: (a) first images associated with first items on a website, (b) first search terms used by users of the website to search for the first items on the website, and (c) personal features of the users. In many embodiments, block 401 can be implemented as shown in FIG. 5 and described below.

Turning ahead in the drawings, FIG. 5 illustrates a flow chart for block 401 of training a recurrent neural network model to create a trained model based at least in part on: (a) first images associated with first items on a website, (b) first search terms used by users of the website to search for the first items on the website, and (c) personal features of the users. Block 401 is merely exemplary and is not limited to the embodiments presented herein. Block 401 can be employed in many different embodiments or examples not specifically depicted or described herein. In some embodiments, the procedures, the processes, and/or the activities of block 401 can be performed in the order presented. In other embodiments, the procedures, the processes, and/or the activities of block 401 can be performed in any suitable order. In still other embodiments, one or more of the procedures, the processes, and/or the activities of block 401 can be combined or skipped.

In many embodiments, block 401 can involve generating encoded representation vectors in blocks 503, 504, and/or 508, which can be used in a block 509 to train the recurrent neural network model. In some embodiments, block 401 of can involve proceeding from block 503 to block 504, then from block 504 to block 508, then from block 508 to block 509. In other embodiments, block 401 can involve proceeding between block 503, block 504, and block 508 in another suitable order before proceeding to block 509. In many embodiments, block 503 can occur after blocks 501 and/or 502. In several embodiments, block 509 can occur after blocks 505, 506, 507, and/or 508.

Still referring to FIG. 5, block 401 can include block 501 of selecting the first items from among a predetermined quantity of top-selling items on the website. For example, the items sold on the website hosted by web server 320 (FIG. 3) can be ranked in order of the top selling, and the top-selling items can be used selected as the first items. In many embodiments, the predetermined quantity of top-selling items can be one hundred thousand items, one million items, ten million items, or another suitable quantity of items to provide a sufficient corpus of training data.

In several embodiments, block 401 also can include block 502 of determining the first images from images that are associated with the first items on the website. In many embodiments, each of the first items that are selected in block 501 can have one or more images associated with the item. For example, a particular item, such as a particular road bike, can be available for sale on the website hosted by web server 320 (FIG. 3). The item can have 3 images, for example, associated with the item, and these images can be displayed on an item page for the item. In some embodiments, the first images can be the items that are associated with the first items selected in block 501.

In a number of embodiments, block 401 additionally can include block 503 of generating an image encoded representation vector for each of the first images. In many embodiments, the image encoded representation vector for each of the first images can be obtained by using a deep convolutional neural network. In various embodiments, the deep convolutional neural network can be a conventional deep convolutional neural network. For example, in some embodiments, the deep convolutional neural network can be the VGG16 ConvNet model developed by the "VGG" team in the 2014 ILSVRC (ImageNet Large Scale Visual Recognition Competition). In many embodiments, the deep convolutional neural network can be trained and used to derive the image encoded representation vector for each of the first images. In many embodiments, the image encoded representation vector can be of the same dimension for each of the first images.

In several embodiments, block 401 further can include block 504 of generating a user encoded representation vector for each user of the users based on a set of personal features of each user using an autoencoder neural network. In several embodiments, the set of personal features of each user can describe personal attributes and/or behaviors of each user.

For example, the personal features of each user can include online activity history for each user across a first set of time periods. In some embodiments, the personal features of each user can include an age of each user, a gender of each user, a location of each user, a brand affinity of each user, a price affinity of each user, and/or other personal features for each user. In many embodiments, these personal features can be determined based on information provided by each user when each user registers at the website, information provided by each user when each user makes a payment through the website, the browsing history of each user (e.g., the items (including the brands and/or the prices of the items) that each user has looked at, added to cart, and/or purchased in the past, and/or other browsing history), the in-store history of each user at brick-and-mortar stores associated with the website (e.g., the brands and/or the prices of items purchased in brick-and-mortar stores, price scans done in brick-and-mortar stores using a mobile application associated with the website, and/or other suitable in-store history), and/or other suitable sources of information. For example, additional sources of information for personalized features for each user can be engagements tracked on other websites outside of the website hosted by web server 320 (FIG. 3), such as by online advertisements on other websites tracking the webpages viewed by each user. For example, a user can read an article at a consumer review website about a particular brand of TV sound system, and the interest of the user in that particular brand of TV sound systems can be tracked and included as a personalized feature for the user in the set of personal features of the user.

In some embodiments, the online activity history for each user can include add-to-carts, purchases, search activity, and/or item views in a category context. For example, a category can be TV sound systems, such that an add-to-cart of a TV sound system can be tracked as an add-to-cart in the category of TV sound systems. In many embodiments, the online activity history for each user can include, for a last (e.g., most recent) online session of each user, a time of the last online session, a cart state after the last online session, a last (e.g., most recent) action performed by each user in the last online session, and/or other suitable information about the last online session of each user. For example, the last action performed can be an item page view of a particular item in a particular category, having a particular brand, at a particular price. In several embodiments, the online activity can be categorized across the first set of time periods. In a number of embodiments, the first set of time periods can include a first time period for the past 60 days, a second time period for the past 30 days, a third time period for the past 7 days, a fourth time period for the past 1 day, and a fifth time period for a current online session. In other embodiments, other suitable time periods can be used. In yet other embodiments, the online activity is not groups across time periods, but can be considered across a single time period, such as the past 3 months, the past 6 months, or the past 12 months.

In many embodiments, the user encoded representation vector for each user can be obtained based on the set of personal features of each user by using an autoencoder neural network. In various embodiments, the autoencoder neural network can be a conventional autoencoder neural network. In several embodiments, the autoencoder neural network can be trained and used to derive the user encoded representation vector of each user. In several embodiments, the dimensions of the set of personal features can be adjusted by the autoencoder neural network in the user encoded representation vector that is output. In many embodiments, the user encoded representation vector for each user can be of the same dimension as the user encoded representation vector for each of the other users. In a number of embodiments, the user encoded representation vector for each user can be of the same dimension as the image encoded representation vector for each of the first images, as generated in block 503.

In a number of embodiments, block 401 additionally can include block 505 of determining the first search terms based on logs of click data for searches performed on the website by the users that searched for the first items. For example, system 300 (FIG. 3) can collect data in logs that track which items are clicked on in the search results returned for searched executed using certain search terms. These logs can be kept over a historical time period, such as the past 3 months, the past 6 month, the past 12 months, the past 2 years, the past 5 years, or another suitable time period. In many embodiments, system 300 (FIG. 3) can use these logs to associate search terms with the first items selected in block 501, and/or associate the search terms and/or the first items with the users that entered the search terms.

In several embodiments, blocks 506, 507, and/or 508, described below, can be performed for each first item of the first items.

In several embodiments, block 401 further can include block 506 of parsing a set of unigrams from a portion of the first search terms that corresponds to each first item. In many embodiments, the unigrams can be single words or terms used in the search terms. For example, the search terms for a particular item can be "TV stand," and these search terms can include two unigrams, namely "TV" and "stand." These unigrams can be associated with the combination of the item and the user, based on the association between the search terms, the first items, and the users.

In a number of embodiments, block 401 additionally can include block 507 of selecting, as a training label, a top set of unigrams from the set of unigrams for each first item. In many embodiments, the TF-IDF (term frequency-inverse document frequency) can be used to analyze the unigrams used and generate a top set of unigrams for each first item. The ranking of the unigrams can be based on TF-IDF, and a quantity of the top unigrams can be selected for each first item. In some embodiments, the quantity can be a predetermined number or a predetermined percentage of the total number of unigrams for each first item. In many embodiments, the unigrams in the top set of unigrams can be associated with the combination of the item and the user.

In several embodiments, block 401 further can include block 508 of generating a label encoded representation vector for each term in the training label. In many embodiments, the label encoded representation vector for each term, k, in the training label can be generated as follows:

$$w_k = U_l \cdot e_k$$

where $w_k$ is the label encoded representation vector for the training label for each term k in the training label, $U_l$ is a label-embedding matrix that is generated with the training labels and encoded to the size of the vocabulary of terms in the first search terms, and $e_k$ is a "one hot" encoded column vector that has a one at the index of the kth term in the vocabulary of the terms in the first search terms. In many embodiments, conventional label encoding techniques can be used to generate the label encoded representation vector.

In a number of embodiments, block 401 additionally can include block 509 of training the recurrent neural network model to create the trained model using the image encoded representation vector for each of the first images, the user encoded representation vector for each of the users, and the label encoded representation vector for the each term in the training labels corresponding to the first items. In many embodiments, the recurrent neural network can be a suitable conventional recurrent neural network. In several embodiments, the recurrent neural network model can be trained to derive search terms for an image in which the output term at a time step t-1 becomes the input term at a time step t.

Figure 6:
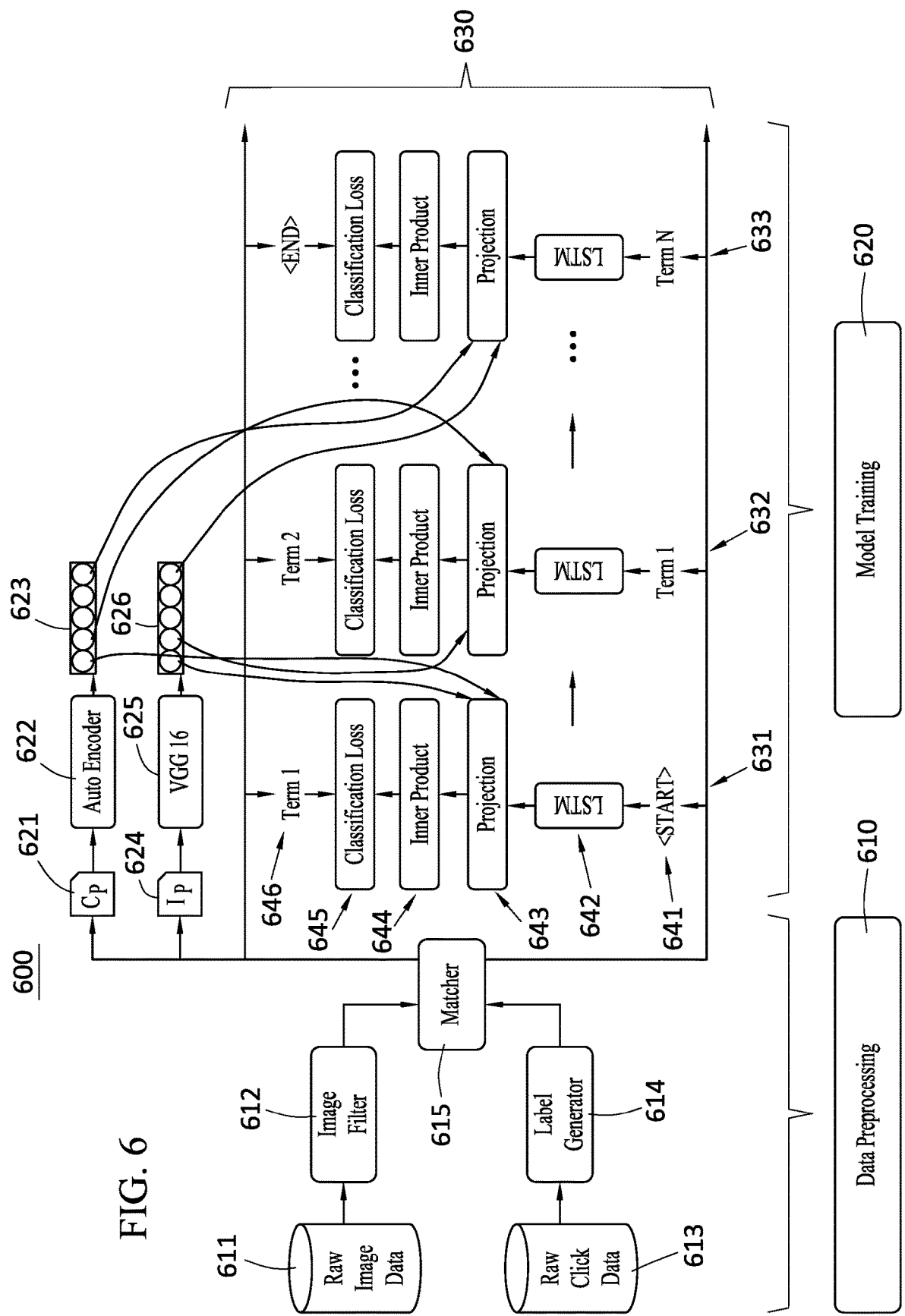
FIG. 6 illustrates a block diagram of a model showing training of a recurrent neural network model, which can be trained and used for automatic personalized image-based search, according to an embodiment.

Turning ahead in the drawings, FIG. 6 illustrates a block diagram of a model 600 showing training of a recurrent neural network model 630, which can be trained and used for automatic personalized image-based search, according to an embodiment. Model 600 is merely exemplary and embodiments of training the recurrent neural network model are not limited to the embodiments presented herein. The recurrent neural network model can be trained in many different embodiments or examples not specifically depicted or described herein. In some embodiments, certain elements, modules, or systems of model 600 can perform various procedures, processes, and/or activities. In other embodiments, the procedures, processes, and/or activities can be performed by other suitable elements, modules, or systems of model 600. In some embodiments, the procedures, the processes, and/or the activities of model 600 can be performed in the order presented. In other embodiments, the procedures, the processes, and/or the activities of model 600 can be performed in another suitable order.

In a number of embodiments, model 600 can include a data preprocessing phase 610 and a model training phase 620. In many embodiments, data preprocessing phase 610 can include obtaining raw image data 611 and raw click data 613. In many embodiments, raw image data 611 can be similar or identical to the images that are associated with the website and/or first images determined in block 502 (FIG. 2). In many embodiments, raw image data 611 can be processed through an image filter 612, can which filter out images that are low quality or otherwise unsuitable for use as training data. The images that are output from image filter 612 can form a set of images ($I_P$) 624. In several embodiments, raw click data 613 can be similar or identical to the logs of click data used in block 505 (FIG. 5). In some embodiments, raw click data 613 can be processed through a label generator 614, which can generate training labels and/or label encoded representation vectors for each term of the training labels, as described in blocks 505-508 (FIG. 5). In a number of embodiments, a matcher 615 can match the images from raw image data 611 that pass through image filter 612 to the labels generated by label generator 614 to output matched data. In many embodiments, the matching to generate the matched data can be based on the association in the logs of click data of the search terms with the first items to which the images are associated.

In many embodiments, model training phase 620 can use the matched data generated by matcher 615. In a number of embodiments, model training phase 620 can include obtain sets of personal features ($C_P$) 621 and set of images ($I_P$) 624. In many embodiments, sets of personal features ($C_P$) 621 can be similar or identical to the sets of personal features for the users described in connection with block 504 (FIG. 5). In a number of embodiments, sets of personal features ($C_P$) 621 can be processed through an autoencoder 622, which can generate a user encoded representation matrix 623, which can include a user encoded representation vector for each of the users. The user encoded representation vector for each of the users that make up user encoded representation matrix 623 can be similar or identical to the user encoded representation vector for each of the users generated in block 504 (FIG. 5). In several embodiments, set of images ($I_P$) 624 can be processed through a deep convolutional neural network 625, such as VGG 16, which can generate an image encoded representation matrix 626, which can include an image encoded representation vector for each of the images. The image encoded representation vector for each of the images that make up image encoded representation matrix 626 can be similar or identical to image encoded representation vector for each of the first images generated in block 503 (FIG. 5).

In many embodiments, recurrent neural network model 630 can include time steps, such as a time steps 631, 632, and 633. At each time step (e.g., 631-633), recurrent neural network model 630 can include an input term 641 and an output term 646. As described above, in many embodiments, output term 646 at time step t-1 becomes input term 641 at time step t. For example, output term 646 at first time step 631 becomes input term 641 at second time step 632.

In many embodiments, during model training phase 620, recurrent neural network model 630 takes as input, for each training label, user encoded representation matrix 623, image encoded representation matrix 626, and a sequence of input vectors ($x_1, \ldots, x_T$) corresponding to the training label. In many embodiments, the first term, $x_1$, can be a special starting vector that represents a 'start' token to indicate the start of the input; the last term, $x_T$, can be a special ending vector that represents an 'end' token to indicate the end of the input; and the intermediate terms can be the label encoded representations of the terms of the training label.

In several embodiments, recurrent neural network model 630 can compute a sequence of hidden states, ($h_1, \ldots, h_T$), and a sequence of outputs, ($y_1, \ldots, y_T$), by iterating through a recurrence relation in recurrent neural network model 630 for time steps t=1 to T. Specifically, at each time step t, recurrent neural network model 630 receives a new input, $x_t$, and the long-term and working memories of recurrent neural network model 630 are passed on from the previous time step t-1. The input term, $x_t$, can be defined as follows:

$$x_t = w_k(t)$$

In many embodiments, recurrent neural network model 630 can include an LSTM (long short-term memory) cell 643, a projection 643, an inner product 644, and/or a classification loss 645 at each time step, which can involve applying one or more convention recurrent neural network training techniques in addition to customized model described below. In several embodiments, LSTM cell 643 can be defined as follows:

$$f_t = \sigma_g(W_f x_t + U_f h_{t-1} + b_f)$$

$$i_t = \sigma_g(W_i x_t + U_i h_{t-1} + b_i)$$

$$o_y = \sigma_g(W_o x_t + U_o h_{t-1} + b_o)$$

$$c_t = f_t \Theta c_{t-1} + i_t \Theta \sigma_c(W_c x_t + U_c h_{t-1} + b_c)$$

$$h_t = o_t \Theta \sigma_h(c_t)$$

where $\sigma_g$, $\sigma_c$, and $\sigma_h$ are sigmoid activation functions, $\Theta$ is the product of gate values, $f_t$ is the forget gate, $i_t$ is the input gate, $o_f$ is the output gate, $h_t$ is the hidden state, $c_t$ is the cell state, $x_t$ is the tth term of $w_k(t)$, the W and U matrices are parameters learned by the cell during training, and $b_f$, $b_i$, $b_o$, and $b_c$ are bias constants.

In a number of embodiments, the output, $o_t$, of the recurrent layer, along with user encoded representation matrix 623 (as referred to as user matrix C) and image encoded representation matrix 626 (as referred to as image matrix I) can be projected into the same low-dimensional space as the label encoded representation vector:

$$x_t = h(U_o^x o(t) + U_I^x I + U_C^x C)$$

where $U_o^x$ is the project matrix for recurrent layer output, $o(t)$, $U_I^x$ is the projection matrix for image matrix I, and $U_C^x$ is the projection matrix for user matrix C. In many embodiments, the number of columns of $U_o^x$, $U_I^x$, and $U_C^x$ can be the same as the label-embedding matrix, $U_l$ described above in block 508 (FIG. 5).

In several embodiments, a scoring layer can be used to label scores, $s(t)$, can be computed by multiplying the transpose of label-embedding matrix, $U_l$, with $x_t$ in order to compute distances between $x_t$ and each label embedding:

$$s(t) = U_l^T x_t$$

A softmax cost function can be used to maximize the log probability assigned to output label, $y_t$ $$y_t = \text{softmax}(s(t))$$

For each training example, which can include each combination of image, user, and training label, recurrent neural network model 630 can set $h_0=0$, $x_1$ to the special starting vector representing the 'start' token, as input term 641 at time step 631, and $y_1$ to the first term in the sequence of terms in the training label, as output term 642 at time step 631. Analogously, $x_2$ is set to the label encoded representation vector of the first term in the sequence of the training label, as input term 641 at time step 632, and $y_2$ is set to the second term in the sequence of terms in the training label, as output term 642 at time step 632, and so forth. Finally, on the last step, in which $x_2$ is set to the label encoded representation vector of the last term in the sequence of the training label, as input term 641 at time step 633, $y_T$ is set to the special 'end' token. The process can repeat for each training example to train the recurrent neural network model.

Returning to FIG. 4, in several embodiments, method 400 also can include a block 402 of receiving an input image that was uploaded by a current user. The current user can be similar or identical to users 350-351 (FIG. 3). In some embodiments, web server 320 (FIG. 3) can provide a search interface that can allow the current user to upload an image, such as an image on a user computer (e.g., 340-341 (FIG. 3)). In many embodiments, the input image can include a depiction of one or more items. For example, the input image can include a depiction of a particular road bike.

In a number of embodiments, method 400 additionally can include a block 403 of obtaining a user encoded representation vector for the current user based on a set of personal features of the current user. In many embodiments, the categories of personal features in the set of personal features of the current user can be similar or identical to the categories of personal features in the set of personal features of each of the users, as described in block 504 (FIG. 5). For example, the personal features of the current user can include online activity history for the current user across a first set of time periods. In some embodiments, the personal features of the current user can include an age of the current user, a gender of the current user, a location of the current user, a brand affinity of the current user, a price affinity of the current user, and/or other personal features for the current user. In many embodiments, these personal features can be determined based on information provided by the current user when the current user registers at the website, information provided by the current user when the current user makes a payment through the website, the browsing history of the current user (e.g., the items (including the brands and/or the prices of the items) that the current user has looked at, added to cart, and/or purchased in the past, and/or other browsing history), the in-store history of the current user at brick-and-mortar stores associated with the website (e.g., the brands and/or the prices of items purchased in brick-and-mortar stores, price scans done in brick-and-mortar stores using a mobile application associated with the website, and/or other suitable in-store history), and/or other suitable sources of information. For example, additional sources of information for personalized features for the current user can be engagements tracked on other web sites outside of the web site hosted by web server 320 (FIG. 3), such as by online advertisements on other websites tracking the webpages viewed by the current user. For example, the current user can read an article at a consumer review website about a particular brand of TV sound system, and the interest of the current user in that particular brand of TV sound systems can be tracked and included as a personalized feature for that current user in the set of personal features of the current user.

In some embodiments, the online activity history for the current user can include add-to-carts, purchases, search activity, and/or item views in a category context. For example, a category can be TV sound systems, such that an add-to-cart of a TV sound system can be tracked as an add-to-cart in the category of TV sound systems. In many embodiments, the online activity history for the current user can include, for a last (e.g., most recent) online session of the current user, a time of the last online session, a cart state after the last online session, a last (e.g., most recent) action performed by the current user in the last online session, and/or other suitable information about the last online session of the current user. For example, the last action performed can be an item page view of a particular item in a particular category, having a particular brand, at a particular price. In several embodiments, the online activity can be categorized across the first set of time periods. In a number of embodiments, the first set of time periods can include a first time period for the past 60 days, a second time period for the past 30 days, a third time period for the past 7 days, a fourth time period for the past 1 day, and a fifth time period for a current online session. In other embodiments, other suitable time periods can be used. In yet other embodiments, the online activity is not groups across time periods, but can be considered across a single time period, such as the past 3 months, the past 6 months, or the past 12 months.

In many embodiments, the users can include the current user. In a number of embodiments, the sets of personal features of the users can include the set of personal features for the current user. In various embodiments, the user encoded representation vectors for the users can include the user encoded representation vector for the current user. For example, in many embodiments, the set of personal features of the current user can be one of the sets of personal features of the users that is used to generate the user encoded representation vector for each of the users in block 504 (FIG. 5). In at least some such cases, the user encoded representation vector for the current user can be obtained by reusing the user encoded representation vector already generated for the current user among each of the users in block 504 (FIG. 5). In other embodiments, the user encoded representation vector for the current user can be obtained separately from the generating of the user encoded representation vector for each of the users in block 504 (FIG. 5).

In many embodiments, the user encoded representation vector for the current user can be obtained based on the set of personal features of the current user by using an autoencoder neural network. In various embodiments, the autoencoder neural network can be the same autoencoder neural network used in block 504 (FIG. 5). For example, the autoencoder neural network that was trained in block 504 (FIG. 5) can be used in block 403, by taking as input the set of personal features of the current user, and generating the user encoded representation vector of the current user. In various embodiments, the autoencoder neural network can be a conventional autoencoder neural network. In several embodiments, the dimensions of the set of personal features can be adjusted by the autoencoder neural network in the user encoded representation vector that is output. In many embodiments, the user encoded representation vector for the current user can be of the same dimension as the user encoded representation vector for each of the other users. In a number of embodiments, the user encoded representation vector for the current user can be of the same dimension as the image encoded representation vector for the input image, as generated in block 404, described below, and/or of the same dimension as the image encoded representation vector for each of the first images, as generated in block 503 (FIG. 5).

In several embodiments, method 400 further can include a block 404 of generating an image encoded representation vector for the input image. In many embodiments, the image encoded representation vector for the input image can be obtained by using a deep convolutional neural network. In various embodiments, the deep convolutional neural network can be the same deep convolutional neural network used in block 503 (FIG. 5). For example, the deep convolutional neural network that was trained in block 503 (FIG. 5) can be used in block 404, by taking as input the input image, and generating the image encoded representation vector for the input image. In various embodiments, the deep convolutional neural network can be a conventional deep convolutional neural network. For example, in some embodiments, as described above in the context of block 503 (FIG. 5), the deep convolutional neural network can be the VGG16 ConvNet model developed by the "VGG" team in the 2014 ILSVRC (ImageNet Large Scale Visual Recognition Competition). In many embodiments, the image encoded representation vector for the input image can be of the same dimension as the image encoded representation vector for each of the first images. In a number of embodiments, the image encoded representation vector for the input can be of the same dimension as the user encoded representation vector for the current user, as generated in block 403, and/or of the same dimension as the user encoded representation vector for each of the users, as generated in block 504 (FIG. 5).

In a number of embodiments, method 400 additionally can include a block 405 of deriving search terms that are personalized to the current user for the one or more items depicted in the input image, using the trained model and based on the user encoded representation vector for the current user and the image encoded representation vector for the input image. For example, the recurrent neural network model trained in block 509 (FIG. 5) and shown in recurrent neural network model 630 (FIG. 6) can be used, as a trained model, to derive the search terms. For example, using recurrent neural network model 630 in FIG. 6, at a first time step, such as time step 631, $x_1$ can be set to the special starting vector representing the 'start' token as input term 641, and the model can be used to compute a distribution over the first term, $y_1$, as output term 646 at time step 631. Various different candidate terms can be derived in a distribution, and the argmax function can be used at time t to predict search term $\hat{s}_t$, based on probability, as follows:

$$\hat{s}_t = \mathrm{argmax}_{s_t} P(s_t | I, C, s_1, \ldots, s_{t-1})$$

The embedding vector for search term $\hat{s}_t$ can be set as the next input term, $x_2$, as input term 641 at time step 632, and so forth, with the process repeated until the special 'end' token is generated as output term 646, which will be the final time step (e.g., time step 633) of recurrent neural network model 630. At the end of the process, the search terms, $\hat{s}_t$, derived for each time t, other than the special 'end' token, can be the search terms derived for the current user. For example, the first term can be derived as "road bike," the second term can be derived as "for," the third term can be derived as "woman," and the fourth term can be derived as the special 'end' token. The search terms derived will thus be "road bike for woman."

In some embodiments, these derived search terms can be displayed to the current user, such as through web server 300 (FIG. 3) sending these derived search terms to a user computer (e.g., 340-341 (FIG. 3)) being used by the current user.

In several embodiments, method 400 optionally can include a block 406 of executing a search of items on the website based on the input image using the search terms derived that are personalized to the current user. In many embodiments, the search can be performed with the search terms that were derived in block 405 using the existing search functionality in web server 320 (FIG. 3), and/or using conventional search techniques that input textual search terms. For example, the derived search terms "road bike for woman," can be used in a conventional textual-based search to search using those search terms. In some embodiments, the search results generated based on the derived search terms can be displayed to the current user, such as through web server 300 (FIG. 3) sending these search results to a user computer (e.g., 340-341 (FIG. 3)) being used by the current user.

Figure 7:
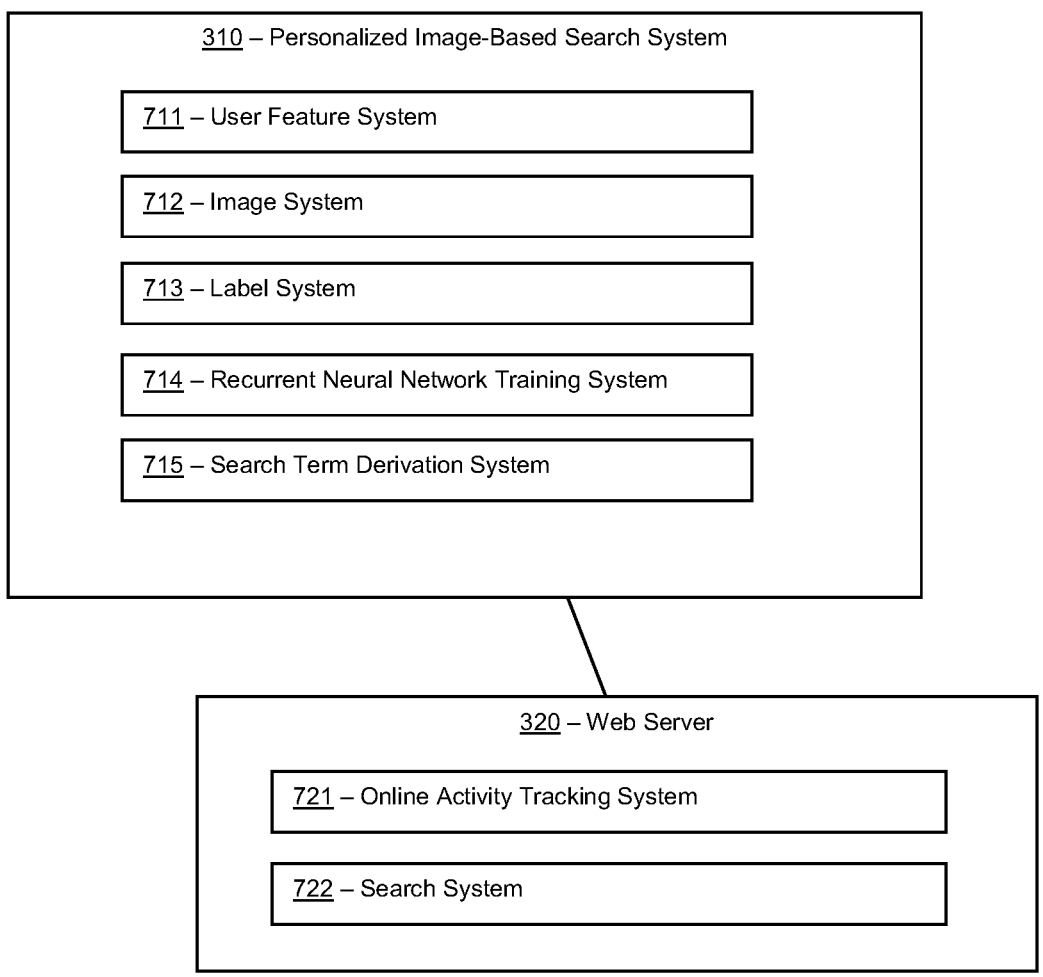
FIG. 7 illustrates a block diagram of system, according to the embodiment shown in FIG. 3.

Turning ahead in the drawings, FIG. 7 illustrates a block diagram of system 300, according to the embodiment shown in FIG. 3. Personalized image-based search system 310 and/or web server 320 are merely exemplary and are not limited to the embodiments presented herein. Personalized image-based search system 310 and/or web server 320 can be employed in many different embodiments or examples not specifically depicted or described herein. In some embodiments, certain elements or system of personalized image-based search system 310 and/or web server 320 can perform various procedures, processes, and/or acts. In other embodiments, the procedures, processes, and/or acts can be performed by other suitable elements or systems. In many embodiments, the systems of personalized image-based search system 310 and/or web server 320 can be modules of computing instructions (e.g., software modules) stored at non-transitory computer readable media. In other embodiments, the systems of personalized image-based search system 310 and/or web server 320 can be implemented in hardware.

In many embodiments, personalized image-based search system 310 can include a user feature system 711. In certain embodiments, user feature system 711 can at least partially perform block 403 (FIG. 4) of obtaining a user encoded representation vector for the current user based on a set of personal features of the current user and/or block 504 (FIG. 5) of generating a user encoded representation vector for each user of the users based on a set of personal features of each user using an autoencoder neural network.

In a number of embodiments, personalized image-based search system 310 can include an image system 712. In certain embodiments, image system 712 can at least partially perform block 404 (FIG. 4) of generating an image encoded representation vector for the input image, block 501 (FIG. 5) of selecting the first items from among a predetermined quantity of top-selling items on the website, block 502 (FIG. 5) of determining the first images from images that are associated with the first items on the website, and/or block 503 (FIG. 5) of generating an image encoded representation vector for each of the first images.

In many of embodiments, personalized image-based search system 310 can include a label system 713. In certain embodiments, label system 713 can at least partially perform block 505 (FIG. 5) of determining the first search terms based on logs of click data for searches performed on the website by the users that searched for the first items, block 506 (FIG. 5) of parsing a set of unigrams from a portion of the first search terms that corresponds to each first item, block 507 (FIG. 5) of selecting, as a training label, a top set of unigrams from the set of unigrams for each first item, and/or block 508 (FIG. 5) of generating a label encoded representation vector for each term in the training label.

In a number of embodiments, personalized image-based search system 310 can include a recurrent neural network training system 714. In certain embodiments, recurrent neural network training system 714 can at least partially perform block 401 (FIG. 4) of training a recurrent neural network model to create a trained model based at least in part on: (a) first images associated with first items on a website, (b) first search terms used by users of the website to search for the first items on the website, and (c) personal features of the users and/or block 509 (FIG. 5) of training the recurrent neural network model to create the trained model using the image encoded representation vector for each of the first images, the user encoded representation vector for each of the users, and the label encoded representation vector for the each term in the training labels corresponding to the first items In many of embodiments, personalized image-based search system 310 can include a search term derivation system 715. In certain embodiments, search term derivation system 715 can at least partially perform block 405 (FIG. 4) of deriving search terms that are personalized to the current user for the one or more items depicted in the input image, using the trained model and based on the user encoded representation vector for the current user and the image encoded representation vector for the input image.

In a number of embodiments, web server 320 can include an online activity tracking system 721. In certain embodiments, online activity tracking system 721 can at least partially perform block 501 (FIG. 5) of selecting the first items from among a predetermined quantity of top-selling items on the website, block 504 (FIG. 5) of generating a user encoded representation vector for each user of the users based on a set of personal features of each user using an autoencoder neural network, and/or block 505 (FIG. 5) of determining the first search terms based on logs of click data for searches performed on the website by the users that searched for the first items.

In many embodiments, web server 320 can include a search system 722. In certain embodiments, search system 722 can at least partially perform block 402 (FIG. 4) of receiving an input image that was uploaded by a current user and/or block 406 (FIG. 4) of executing a search of items on the website based on the input image using the search terms derived that are personalized to the current user.

In many embodiments, the techniques described herein can provide a practical application and several technological improvements. Specifically, the techniques described herein provide for training and using a recurrent neural network model to automatically determine, based on personal features of a given user, and an uploaded image, search terms to describe one or more items in the image, which are personally relevant to the user. Previous approaches that attempt to provide descriptive labels or tags based on an image are not designed to provide search terms, so the descriptive label or tags are often not appropriate as search terms. For example, a descriptive label for an image could be "red road bike on a mountain road," but the part about the mountain road is irrelevant for a product search. Moreover, previous approaches that provide descriptive labels and/or tags do not customize these descriptive labels and/or tags based on the personal features of the user. The level of personalization provided by the techniques provided herein does not exist in conventional approaches to generate descriptive labels and/or tags from images.

Additionally, the techniques described herein can run periodically using new information and data continually being received from actions of users (e.g., 350-351 (FIG. 3)) on the website hosted by web server 320 (FIG. 3), the responses to the users (e.g., 350-351 (FIG. 3)) to search results, and new items being added to the website. In many embodiments, running these techniques periodically can provide recommendations that are relevant to users for the current time. In many embodiments, hundreds of users or more can upload images every minute to perform personalized image-based searched on the web site.

In a number of embodiments, the techniques described herein can solve a technical problem that arises within the realm of computer networks, as the constraints of textual search term input when searching for items using a search engine on a website does not exist outside the realm of computer networks. Moreover, the techniques described herein can solve a technical problem that cannot be solved outside the context of computer networks. For example, the recurrent neural network model cannot be trained outside the context of computer networks, in view of a lack of data. Specifically, the online activity history of a user and logs of click data for search results used to train the recurrent neural network model cannot be replaced with other forms of information, as it would not be possible to know which index terms in a direct mail paper catalog, for example, were used to lookup a product in the catalog. Moreover, these index terms are provided in an index of the catalog, which can be browsed, unlike a search interface, which imposes constraints on the user to call to mind the textual search terms to be used.

Although automatic personalized image-based search has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 4-5 may include different procedures, processes, and/or activities and be performed by many different modules, in many different orders, and/or one or more of the procedures, processes, or activities of FIGS. 4-6 may include one or more of the procedures, processes, or activities of another different one of FIGS. 4-6. As another example, the systems within personalized image-based search system 310 and/or web server 320 in FIG. 7 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      training a recurrent neural network model to create a trained model based at least on: (a) first images associated with first items on a website, (b) first search terms used by users of the website to search for the first items on the website, and (c) personal features of the users, wherein an output term of the recurrent neural network model at a first time step is used as an input term at a immediately subsequent time step in the recurrent neural network model;
      receiving an input image that was uploaded by a current user, the input image comprising a depiction of one or more items;
      obtaining a user encoded representation vector for the current user based on a set of personal features of the current user;
      generating an image encoded representation vector for the input image;
      deriving search terms that are personalized to the current user for the one or more items depicted in the input image, using the trained model and based on the user encoded representation vector for the current use rand the image encoded representation vector for the input image, wherein the search terms comprise one or more item names for the one or more items and one or more features for the one or more items that are personalized to the current user based on the set of personal features; and
      executing a search of items on the website based on the input image using the search terms derived that are personalized to the current user,
   wherein training the recurrent neural network model comprises:
      generating a respective user encoded representation vector for each user of the users based on a respective set of personal features of the each user using an autoencoder neural network.

2. The system of claim 1, wherein training the recurrent neural network model further comprises:
   selecting the first items from among a predetermined quantity of top-selling items on the website;
   determining the first images from images that are associated with the first items on the website; and
   generating a respective image encoded representation vector for each of the first images.

3. The system of claim 2, wherein generating the respective image encoded representation vector for each of the first images comprises:
   generating the respective image encoded representation vector for each of the first images by training a deep convolutional neural network.

4. The system of claim 3, wherein generating the respective image encoded representation vector for the input image comprises:
   generating the respective image encoded representation vector for the input image using the deep convolutional neural network.

5. The system of claim 2, wherein the autoencoder neural network is trained to generate the respective user encoded representation vector such that a dimension of the respective user encoded representation vector and a dimension of the respective image encoded representation vector for the each of the first images are identical.

6. The system of claim 5, wherein the respective set of personal features of the each user of the users comprises at least one of: a respective age of the each user, a respective gender of the each user, a respective location of the each user, a respective brand affinity of the each user, or a respective price affinity of the each user.

7. The system of claim 5, wherein:
   the users comprise the current user;
   the respective sets of personal features of the users comprise the set of personal features for the current user; and
   the respective user encoded representation vectors for the users comprise the user encoded representation vector for the current user.

8. The system of claim 5, wherein training the recurrent neural network model further comprises:
   determining the first search terms based on logs of click data for searches performed on the website by the users that searched for the first items; and
   for each first item of the first items:
      parsing a set of unigrams from a portion of the first search terms that corresponds to the each first item;
      selecting, as a training label, a top set of unigrams from the set of unigrams for the each first item; and
      generating a respective label encoded representation vector for each term in the training label.

9. The system of claim 8, wherein training the recurrent neural network model further comprises:
   training the recurrent neural network model to create the trained model using the respective image encoded representation vector for each of the first images, the respective user encoded representation vector for each of the users, and the respective label encoded representation vector for the each term of each of the training labels corresponding to the first items.

10. A method being implemented via execution of computing instructions configured to run at one or more processors and stored at one or more non-transitory computer-readable media, the method comprising:
    training a recurrent neural network model to create a trained model based at least on: (a) first images associated with first items on a website, (b) first search terms used by users of the website to search for the first items on the website, and (c) personal features of the users, wherein an output term of the recurrent neural network model at a first time step is used as an input term at a immediately subsequent time step in the recurrent neural network model;

receiving an input image that was uploaded by a current user, the input image comprising a depiction of one or more items;

obtaining a user encoded representation vector for the current user based on a set of personal features of the current user;

generating an image encoded representation vector for the input image;

deriving search terms that are personalized to the current user for the one or more items depicted in the input image, using the trained model and based on the user encoded representation vector for the current user and the image encoded representation vector for the input image, wherein the search terms comprise one or more item names for the one or more items and one or more features for the one or more items that are personalized to the current user based on the set of personal features; and executing a search of items on the website based on the input image using the search terms derived that are personalized to the current user, wherein training the recurrent neural network model comprises:
generating a respective user encoded representation vector for each user of the users based on a respective set of personal features of the each user using an autoencoder neural network.

11. The method of claim 10, wherein training the recurrent neural network model comprises:
selecting the first items from among a predetermined quantity of top-selling items on the website;
determining the first images from images that are associated with the first items on the website; and
generating a respective image encoded representation vector for each of the first images.

12. The method of claim 11, wherein generating the respective image encoded representation vector for each of the first images comprises:
generating the respective image encoded representation vector for each of the first images by training a deep convolutional neural network.

13. The method of claim 12, wherein generating the respective image encoded representation vector for the input image comprises:
generating the respective image encoded representation vector for the input image using the deep convolutional neural network.

14. The method of claim 11, wherein the autoencoder neural network is trained to generate the respective user encoded representation vector such that a dimension of the respective user encoded representation vector and a dimension of the respective image encoded representation vector for the each of the first images are identical.

15. The method of claim 14, wherein the respective set of personal features of the each user of the users comprises at least one of: a respective age of the each user, a respective gender of the each user, a respective location of the each user, a respective brand affinity of the each user, or a respective price affinity of the each user.

16. The method of claim 14, wherein:
the users comprise the current user;
the respective sets of personal features of the users comprise the set of personal features for the current user; and
the respective user encoded representation vectors for the users comprise the user encoded representation vector for the current user.

17. The method of claim 14, wherein training the recurrent neural network model further comprises:
determining the first search terms based on logs of click data for searches performed on the website by the users that searched for the first items; and
for each first item of the first items:
parsing a set of unigrams from a portion of the first search terms that corresponds to the each first item;
selecting, as a training label, a top set of unigrams from the set of unigrams for the each first item; and
generating a respective label encoded representation vector for each term in the training label.

18. The method of claim 17, wherein training the recurrent neural network model further comprises:
training the recurrent neural network model to create the trained model using the respective image encoded representation vector for each of the first images, the respective user encoded representation vector for each of the users, and the respective label encoded representation vector for the each term of each of the training labels corresponding to the first items.

* * * * *